Dec. 23, 1924. 1,520,482
A. F. SHORE
SPRING SUPPORT FOR VEHICLES
Filed Feb. 15, 1921
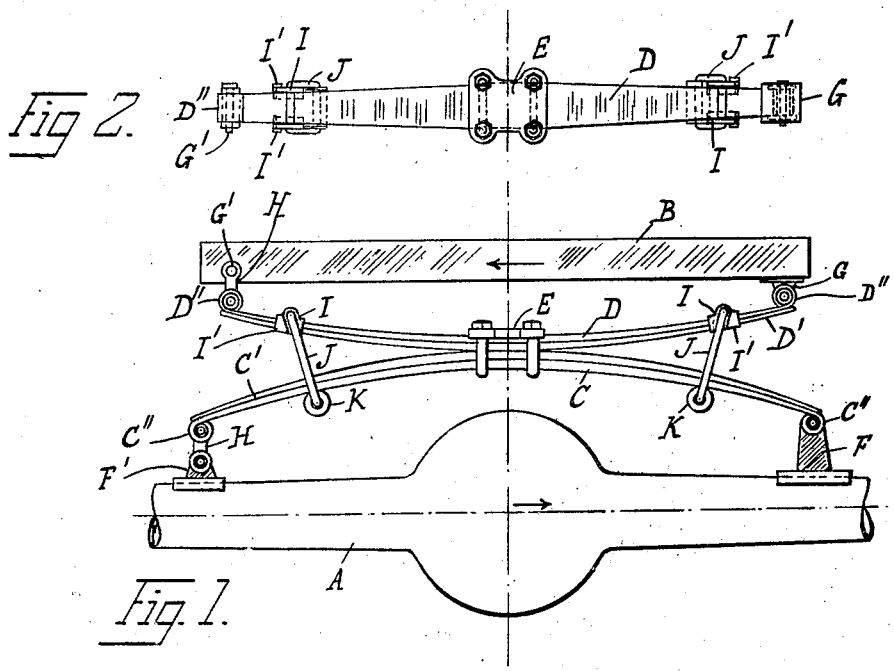
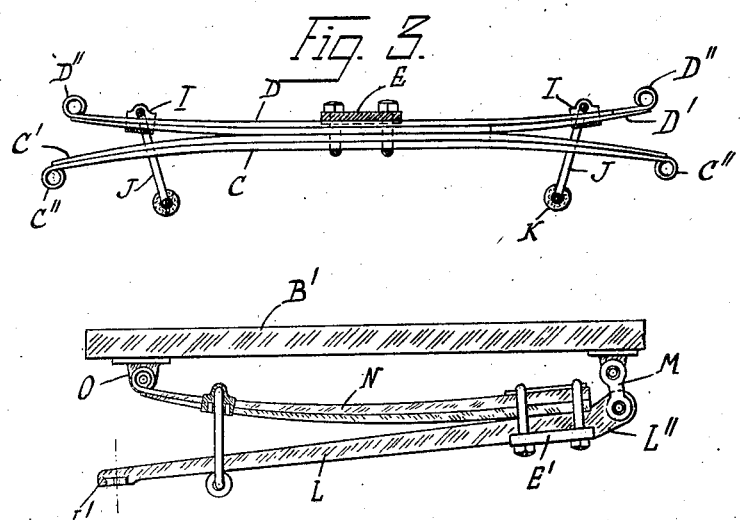
Albert F. Shore, INVENTOR.
BY Gerd Hoffman, ATTORNEY.

Patented Dec. 23, 1924.

1,520,482

UNITED STATES PATENT OFFICE.

ALBERT F. SHORE, OF NEW YORK, N. Y.

SPRING SUPPORT FOR VEHICLES.

Application filed February 15, 1921. Serial No. 445,101.

*To all whom it may concern:*

Be it known that I, ALBERT F. SHORE, a citizen of the United States, residing at New York, in the county of New York and State of New York, have invented certain new and useful Improvements in Spring Supports for Vehicles, of which the following is a full, clear, and exact specification.

My invention relates to spring supports for vehicles, and more particularly to so-called leaf-spring suspension systems of vehicles. Its object is to provide a comparatively simple construction of this character, which will yield a maximum of supporting power and flexure with a minimum of cross-section or weight.

Another object of the invention is to reduce or limit the amount of rebound.

These objects and the advantages of my invention will appear fully from the specification following hereinafter, and the novelty will be pointed out in the appended claims.

According to the invention, the maximum supporting power for a given weight of spring metal is obtained by using comparatively heavy individual leaves which gradually taper toward the extremity, both in width and thickness. By the use of this design, a single leaf spring is as elastic and strong as a plurality of thinner leaves. It is, however, preferable to use at least two leaves as a safety factor, in the event of possible breakage.

The increased transverse stroke I obtain by the use of a thinner and shorter spring in the usual limited space, as in a part or full elliptic unit, and by providing two opposed comparatively flat half or quarter elliptical units, which are fastened together at the center or at the part of thickest and widest section, and furthest apart or separated at the thinner and narrower extremity.

In the rolling contact assemblies, increased elasticity is obtained by the use of a comparatively soft spring which, first, is almost free from friction, and, second, instead of weakening by the flattening of the curve under the action of overload, will provide an increased length of contact support near the center or point of connection or anchorage, and, therefore, increased strength. This compensation feature allows of the use of a spring of comparatively light construction.

The transverse vibrations are reduced by the comparative softness under light loads and increasing strength under heavy loads, while the undue rebounds are checked by a link fastened preferably to the upper members, which permits full compression but not recoil beyond the position it occupies, as when there is a light or no load on the vehicle.

My invention is illustrated in the accompanying drawing, in which Figure 1 is a side elevation showing an embodiment in connection with a half elliptical form of spring construction applied to the rear axle of a motor vehicle and extending transversely of the vehicle axis.

Fig. 2 is a top view of the upper leaf spring shown in Figure 1; and

Fig. 3 shows in side elevation the position which the springs assume when compressed by an abnormal increase in load; and Fig. 4 shows a further embodiment of my invention, applied to a spring support extending lengthwise of the vehicle axis.

In the embodiment shown in Figs. 1 to 3, A represents the rear axle of a motor vehicle and B a portion of the chassis frame. Interposed between the parts A and B is a pair of opposed leaf springs, a lower spring and an upper spring, each of which springs consists preferably of a main leaf C, D and an auxiliary leaf C', D'. As shown, the springs are arranged with their convex surfaces facing each other, and they are rigidly connected approximately at the central portion where they are in contact with each other by a clamp E. At the ends, the leaves C, D are formed with eyes C'', D'', respectively, for connection with the axle A and the frame B. While this connection at one side (shown at the right in the drawing) is a rigid one, except for a pivotal movement on the fixed bearings F, G, respectively, the connection at the left side is made by means of links H interposed between the respective eyes C'', D'' and the fixed bearings F', G' on the axle and frame, respectively. This arrangement will effectively prevent "creeping" of the chassis frame with respect to the axle.

To the leaves D, D' I rigidly secure at a short distance from their ends, bearings I, pivotally supporting links J embracing the leaves C, C' and carrying on the lower side of these leaves cushioning rollers K of rubber or other soft material. Lugs I' on the bearings I prevent the links J from swinging outwardly too far. It will be seen that the links J with their rollers K, while permitting full compression, will prevent excessive rebounds, after the springs have been compressed under a sudden increase in load, the rollers K not only prevent undue shock, but also objectionable noise in the event of a rebound of the upper structure.

The leaves of the springs, as shown in the drawing, are preferably made tapering or reduced from the point of anchorage toward the outer ends, not only in thickness but in width as well, resulting in the advantages above set forth.

In Fig. 3 I have shown the upper and lower springs compressed and in contact with each other for a considerable part of their length from the center outwardly, thus shortening the distance between the point of support and the point of application of the load. To obtain this effect, the relative cross-sections between the center and extremities of the two spring members are so proportioned that the moment of resistance and fiber stress is not absolutely constant, the weakest point being at its anchorage in the center.

In Fig. 4 I have shown an embodiment suitable for a spring support arranged lengthwise of the vehicle, instead of transversely as in Figs. 1 to 3. In this embodiment, a lever L constitutes the means against which the spring N operates under an increase in load to shorten the distance between the load and support, said lever having one of its ends L' connected (preferably rigidly) to the axle of the vehicle, while its other end L'' has a link or shackle connection M with the frame B'. Adjacent to this end L'', the lever L is connected rigidly by means of a clamp E' to one end of a quarter-elliptical leaf spring N having its other end fulcrumed on a fixed bearing O secured to the chassis frame B'. The lever L might be made in the form of a leaf spring, but I prefer to make it of non-laminated metal and of a lesser degree of elasticity.

This construction provides a cantilever effect of distinct advantages. This form of my invention also is preferably provided with the rebound-arresting means described in connection with Figs. 1 to 3. The leaf spring also has its attached or supported end preferably thicker and wider than its other end.

It is to be understood that I have shown and described two embodiments only of carrying out my invention and that various modifications may be made without departing from its nature as defined in the appended claims.

I claim:

1. In a spring-support for vehicles, a leaf-spring tapering from its point of anchorage both in thickness and width, said taper being so proportioned that the fiber stress under load is slightly greater near the said point of anchorage than toward its ends, and means against which the spring operates under an increase of load to shorten the distance between the load and support.

2. In a spring-support for vehicles, a pair of leaf springs arranged in opposed bowed relation and secured together intermediate the ends, said springs tapering from their point of anchorage both in thickness and width, said taper being so proportioned that the fiber stress under load is slightly greater near the point of connection than toward the ends, whereby one spring co-operates with the other under an increase of load to shorten the distance between the load and support.

In testimony whereof, I affix my signature.

ALBERT F. SHORE.